US011820532B2

(12) United States Patent
Kuperman

(10) Patent No.: US 11,820,532 B2
(45) Date of Patent: Nov. 21, 2023

(54) UNMANNED AERIAL VEHICLE LAUNCHING CAPSULE

(71) Applicant: SPEAR U.A.V LTD, Tel Aviv (IL)

(72) Inventor: Gedalia Kuperman, Tel Aviv (IL)

(73) Assignee: SPEAR U.A.V LTD, Tel Aviv (IL)

( * ) Notice: Subject to any disclaimer, the term of this patent is extended or adjusted under 35 U.S.C. 154(b) by 188 days.

(21) Appl. No.: 17/310,005

(22) PCT Filed: Jan. 9, 2020

(86) PCT No.: PCT/IL2020/050038
§ 371 (c)(1),
(2) Date: Jul. 9, 2021

(87) PCT Pub. No.: WO2020/144690
PCT Pub. Date: Jul. 16, 2020

(65) Prior Publication Data
US 2022/0097867 A1    Mar. 31, 2022

Related U.S. Application Data

(60) Provisional application No. 62/790,488, filed on Jan. 10, 2019.

(51) Int. Cl.
*B64F 1/10*    (2006.01)
(52) U.S. Cl.
CPC ..................... *B64F 1/10* (2013.01)
(58) Field of Classification Search
CPC ...... F41F 1/00; F41F 3/00; F41F 3/042; F41F 3/045; F41F 3/065; F41F 1/10; B64F 1/04; B64F 1/06; B64F 1/10; B64C 39/024; B64C 2201/08; B64C 2201/102; B64C 2201/146; B64C 2201/201; B64C 13/20
See application file for complete search history.

(56) References Cited

U.S. PATENT DOCUMENTS 3,939,967 A * 2/1976 Tenney ................... F42B 39/00
                                                                220/284
4,455,917 A    6/1984 Shook
7,207,254 B2 * 4/2007 Veitch ....................... F41F 3/04
                                                                89/1.807

(Continued)

FOREIGN PATENT DOCUMENTS

WO    2014/035518 A2    3/2014
WO    2015/127178 A1    8/2015

*Primary Examiner* — Justin M Benedik
(74) *Attorney, Agent, or Firm* — Vorys, Sater Seymor and Pease LLP; Anthony P. Venturino; Maryellen Feehery Hank

(57) ABSTRACT

Provided is a system for releasing an Unmanned Aerial Vehicle (UAV), including: a capsule including: a UAV including a controller; and a release actuator configured to release the UAV from the capsule; wherein the capsule is configured to be at least one of launched and deployed; the system further includes: at least one sensor; a release condition evaluation module, connected with the at least one sensor; and a release command module, connected with the release condition evaluation module, and configured to activate the release actuator upon at least one release condition being met; wherein the process of deploying the capsule and/or launching the capsule is a separate process from the process of releasing the UAV from the capsule.

5 Claims, 15 Drawing Sheets

(56) References Cited

U.S. PATENT DOCUMENTS

| | | | | |
|---|---|---|---|---|
| 7,398,721 B1* | 7/2008 | Alberding | ............ | F41F 3/04 89/1.819 |
| 7,484,450 B2* | 2/2009 | Hunn | ............ | F41F 3/04 124/61 |
| 8,662,441 B2* | 3/2014 | Powell | ............ | B64C 39/024 89/1.809 |
| 2008/0093501 A1 | 4/2008 | Miller et al. | | |
| 2010/0281745 A1* | 11/2010 | Condon | ............ | F41C 27/06 42/90 |
| 2011/0315817 A1* | 12/2011 | Miralles | ............ | F41F 1/00 244/63 |
| 2012/0068010 A1 | 3/2012 | Bossert et al. | | |
| 2015/0267996 A1* | 9/2015 | Su | ............ | F41B 11/80 89/1.816 |
| 2016/0137312 A1* | 5/2016 | Osterhout | ............ | G02B 27/0172 244/17.23 |
| 2017/0057635 A1* | 3/2017 | Strayer | ............ | B64C 39/024 |
| 2017/0146137 A1 | 5/2017 | Koelzer | | |

\* cited by examiner

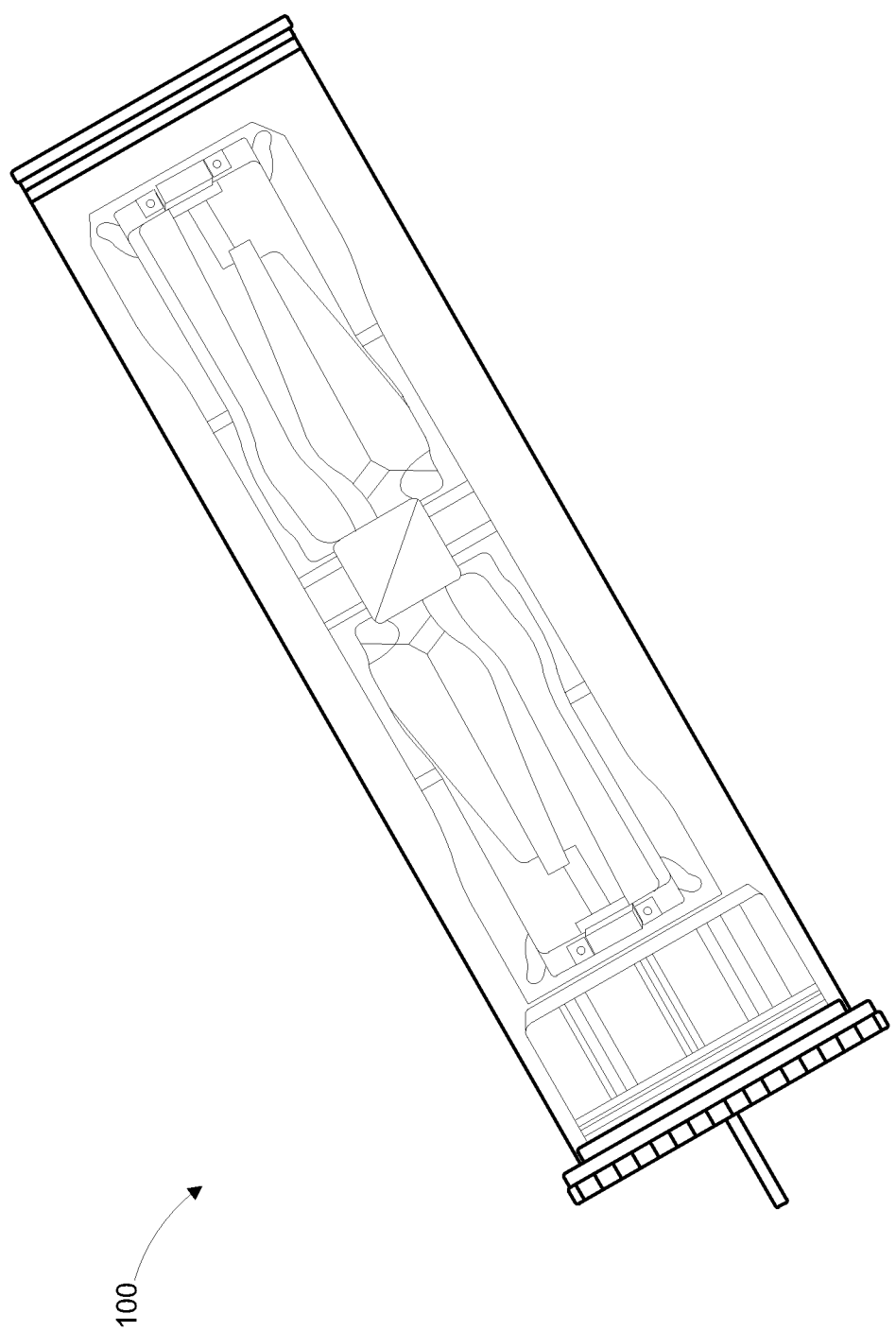

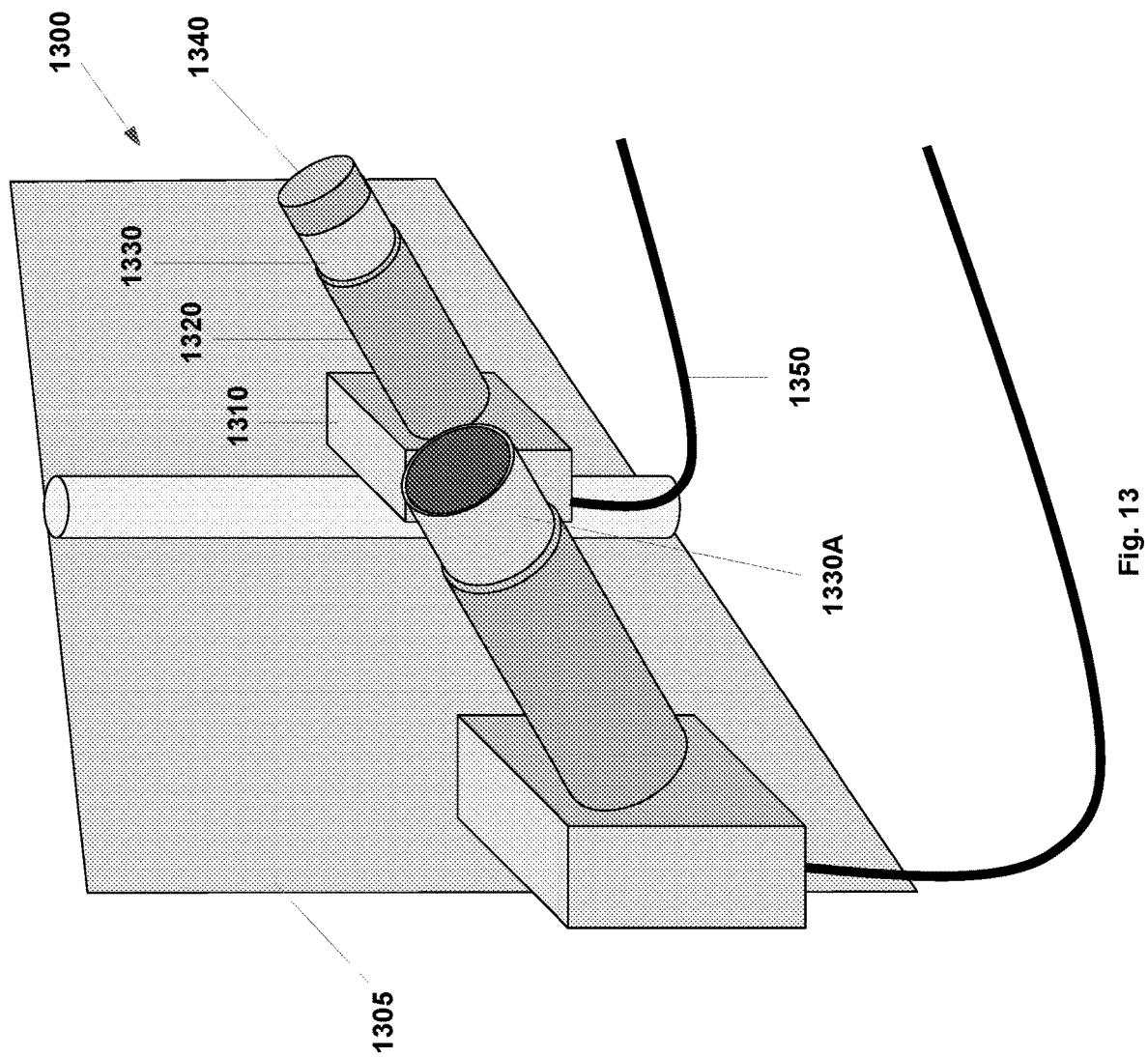

UNMANNED AERIAL VEHICLE LAUNCHING CAPSULE

CROSS-REFERENCE TO RELATED PATENT APPLICATIONS

This patent application claims priority from and is related to U.S. Provisional Patent Application Ser. No. 62/790,488, filed Jan. 10, 2019, this U.S. Provisional Patent Application incorporated by reference in its entirety herein.

FIELD OF THE INVENTION

The present invention generally relates to Unmanned Aerial Vehicles (UAV) and specifically to a designated capsule for launching a UAV.

BACKGROUND

Canister-launched drones may be deployed by ejecting the canister from an underwater platform. This canister floats to the surface, rights itself and ejects the drone. One example (Lockheed Martin Outrider) features a complicated mechanism, where the canister must deploy several arms to right itself, eject a lid sealing its interior, and then eject the drone itself.

There are also self-contained launchers that do not involve canisters that are separate from the launchers. One example of a self-contained launcher is a man-portable launcher, as used by AeroVironment Switchblade or UVision Hero loitering munitions. Soldiers place the launcher in the field and launch the drone. Another example is the launchers advertised by UVision and IAI for their large-sized loitering munitions (Hero and Harop respectively), where a large launcher can store and launch many drones on command.

Those existing solutions allow a drone to be launched on command, allowing a vehicle or a dismounted force to launch a drone from its present location. Canister-launched applications may see the drone deploy at some distance from the launching vehicle, but this separation only serves a technical purpose such as allowing the drone to be released into the air and at an altitude where it can operate.

Some applications may require the drone to be launched from an unattended site with minimal infrastructure, or to be deployed from a vehicle or a dismounted force but launched later or given some external conditions. For example, drone launchers may need to be hidden by a ground force in an area in order to be launched when an opposing force enters the area, or a marine vehicle may need to leave a drone canister near a target area, and only launch it later after the marine vehicle leaves the area. Existing solutions do not easily support these applications, as they would require a force or vehicle to remain on site to launch the drone when needed, or alternately require a large and expensive launcher to be left at the site.

Therefore, there is a need for a designated launching capsule that would allow the release of a UAV from the capsule to happen independently from the capsule's launch or deployment (i.e. based on a different signal or different conditions), all while maintaining the compact and compatible form factor of a launch canister, which allows it to be carried and deployed from diverse platforms and reduces its signature once deployed.

SUMMARY

According to an aspect of the present invention there is provided a system for releasing an Unmanned Aerial Vehicle (UAV), comprising: a capsule comprising: a UAV comprising a controller; and a release actuator configured to release the UAV from the capsule; wherein the capsule is configured to be at least one of launched and deployed; the system further comprises: at least one sensor; a release condition evaluation module, connected with the at least one sensor; and a release command module, connected with the release condition evaluation module, and configured to activate the release actuator upon at least one release condition being met; wherein the process of deploying the capsule and/or launching the capsule is a separate process from the process of releasing the UAV from the capsule.

The system may further comprise a UAV activation command module configured to activate the UAV prior or during the UAV release.

The system may further comprise a holder configured to hold the capsule and provide the capsule with services.

The services may comprise at least one of remote activation, remote control and external power supply.

The holder may further be configured to enable transitioning of the capsule from a state suitable for long-term storage or standby to a state suitable for releasing the UAV.

The holder may further be configured to at least one of power up the capsule; and send the capsule at least one signal commanding the capsule to release the UAV.

The holder may be installed on a land platform selected from the group consisting of manned or unmanned ground vehicle, building and fencepost.

The holder may be an underwater holder comprising a restraining device configured to hold the capsule underwater or at the water's surface.

The restraining device may be selected from the group consisting of a clamp and a tether comprising wires for power supply and communication with the capsule.

The holder may further comprise a deployment actuator configured to at least one of: extend the restraining device; detach the restraining device; cut the restraining device; and open the restraining device.

The system may further comprise: a deployment condition evaluation module, connected with the at least one sensor; and a deployment command module, connected with the deployment condition evaluation module; wherein the holder may comprise a deployment actuator; and wherein the deployment command module may be configured to activate the deployment actuator upon at least one deployment condition being met.

The system may further comprise a capsule activation command module configured to activate the capsule prior or during the capsule's deployment.

According to another aspect of the present invention there is provided a method of releasing an Unmanned Aerial Vehicle (UAV), comprising: launching a capsule comprising a UAV from one of a launcher and a holder; evaluating, by a release condition evaluation module, at least one input relevant to at least one condition for releasing the UAV; and releasing the UAV from the capsule by activating a release actuator upon at least one release condition being met; wherein the process of launching the capsule is a separate process from the process of releasing the UAV from the capsule.

The method may further comprise activating the UAV prior or during the UAV release.

The method may further comprise enabling transitioning of the capsule from a state suitable for long-term storage or standby to a state suitable for releasing the UAV.

The holder may be installed on a land platform selected from the group consisting of manned or unmanned ground vehicle, building and fencepost.

The method may further comprise holding the capsule underwater or at the water's surface using a restraining device.

The restraining device may be selected from the group consisting of a clamp and a tether comprising wires for power supply and communication with the capsule.

The method may further comprise at least one of: extending the restraining device; detaching the restraining device; cutting the restraining device; and opening the restraining device.

The method may further comprise activating a deployment actuator upon at least one deployment condition being met.

The method may further comprise activating the capsule prior or during the capsule's deployment.

The method may further comprise: evaluating, by a deployment condition evaluation module, at least one input relevant to at least one condition for deploying the capsule; and deploying the capsule from the holder by activating a deployment actuator upon at least one deployment condition being met.

According to another aspect of the present invention there is provided a designated Unmanned Aerial Vehicle (UAV) capsule, comprising: a capsule body, comprising: a gas inflator mounted above at least partially sealed bottom end of the capsule body; a designated piston comprising tenons; the designated piston mounted above the gas inflator; a UAV mounted above the designated piston; and an upper cover, mounted above the UAV, and configured to at least partially seal the capsule body's upper end; wherein the gas inflator is configured to release gas, towards the designated piston to be flowing between the tenons thereby discarding the upper cover and pushing the designated piston thereby releasing the UAV.

The capsule body may further comprise an activation cable configured to enable activation of the release.

According to another aspect of the present invention there is provided a designated Unmanned Aerial Vehicle (UAV) capsule, comprising: a capsule body, comprising: a gas generator mounted above at least partially sealed bottom end of the capsule body; a UAV mounted above the gas generator; at least one divider mounted between the UAV and an inner circumference of the capsule body; the at least one divider configured to create at least partial seal between the UAV and the capsule body, thereby creating an at least partially sealed lower volume between the gas generator and the at least one divider; and an upper cover configured to at least partially seal the capsule body's upper end; wherein the gas generator is configured to release gas into the at least partially sealed lower volume, thereby increasing pressure inside the at least partially sealed lower volume and releasing the UAV.

The capsule body may further comprise a spacer mounted between the UAV and the upper cover.

The capsule body may further comprise a weight mounted between the gas generator and the at least partially sealed bottom end of the capsule body and configured to enable mass distribution in the capsule body.

According to another aspect of the present invention there is provided a designated Unmanned Aerial Vehicle (UAV) capsule, comprising: a capsule body, comprising: a gas generator mounted inside a tube above a sealed bottom end of the capsule body; wherein an upper end of the tube is open; a pusher mounted above the tube, thereby creating at least partially sealed volume between the gas generator and the pusher; and a UAV mounted above the pusher; wherein the gas generator is configured to release gas into the partially sealed volume, thereby increasing pressure inside the at least partially sealed volume and releasing the UAV.

The capsule body may further comprise an electrical interface configured to allow the UAV to be activated and communicated with from outside the capsule.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1 is a schematic view of an exemplary designated capsule, according to embodiments of the present invention;

FIG. 13 is a schematic view of an exemplary holder, according to embodiments of the present invention.

DETAILED DESCRIPTION OF PREFERRED EMBODIMENTS

Figure 1A:
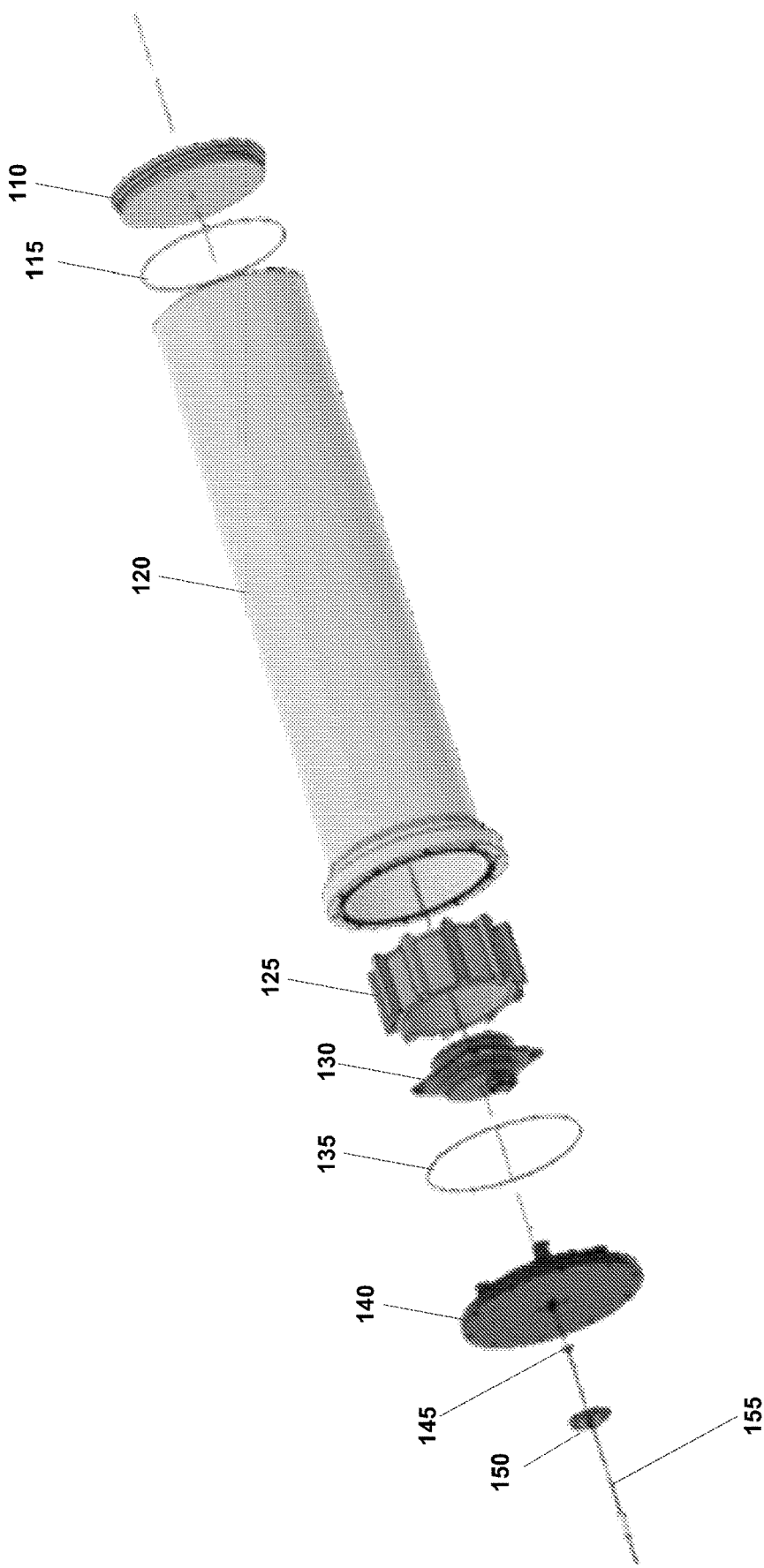
FIG. 1A is an exploded view of the exemplary designated capsule of FIG. 1.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention provides a system and method for launching or deploying a capsule containing an Unmanned Aerial Vehicle (UAV) and releasing the UAV from the capsule into the air. The present invention further provides a designated capsule for releasing an Unmanned Aerial Vehicle (UAV) encapsulated inside the capsule. The capsule of the present invention may optionally be launched underwater and intended to release the UAV using a designated release mechanism.

An internal energy source creates a strong force pushing the UAV out of the capsule. For example, a gas generator generates high-pressure gas inside the capsule, and the gas pushes a piston through a cylinder, pushing the UAV. According to embodiments of the present invention, the piston may be the UAV's body, equipped with suitable seals, moving inside the capsule's cylindrical cavity. Alternatively, the piston and cylinder may be dedicated parts located underneath the UAV, where the piston comprises a pusher that is pressed against the UAV's body, pushing it out. The UAV's body is pushed against the capsule's cap, breaking its seal and pushing it out and away from the capsule. The UAV leaves the capsule after the cap, completing the release process. According to embodiments of the present invention, the moving parts of the assembly, namely the piston, cylinder, UAV body and cap, are all in contact prior to release, ensuring that they move smoothly without one part accelerating inside the capsule and impacting the other.

The capsule or the UAV may incorporate a release controller, capable of initiating the UAV's release process based on certain conditions being met and/or commands being received from an operator or a connected system. The controller may be connected to sensors or datalinks comprised in the capsule or the UAV, enabling it to receive information necessary to evaluate the conditions or receive the command.

The conditions imposed on the release may include the capsule's geographic position, angular state, perceived motion, elapsed time, capsule sensor inputs or an alert produced by an external system.

FIG. 1 is a schematic view of an exemplary designated capsule 100, according to embodiments of the present invention.

FIG. 1A is an exploded view of the exemplary designated capsule 100 of FIG. 1.

The capsule 100 comprises an upper cover 110, a sealing ring 115, a capsule body 120, a designated piston 125, a gas inflator 130, such as, Mosa's MPS-5 available from http://www.twmosa.com/industria/76?lang=en; a sealing ring 135, a lower cover 140, a sealing ring 145, a gasket 150 and an activation cable 155. According to embodiments of the present invention, the capsule may further comprise wired or wireless communication means.

The capsule further comprises an Unmanned Aerial Vehicle (UAV) (not shown) encompassed in the capsule body 120 between the piston 125 and the upper cover 110.

Figure 2:
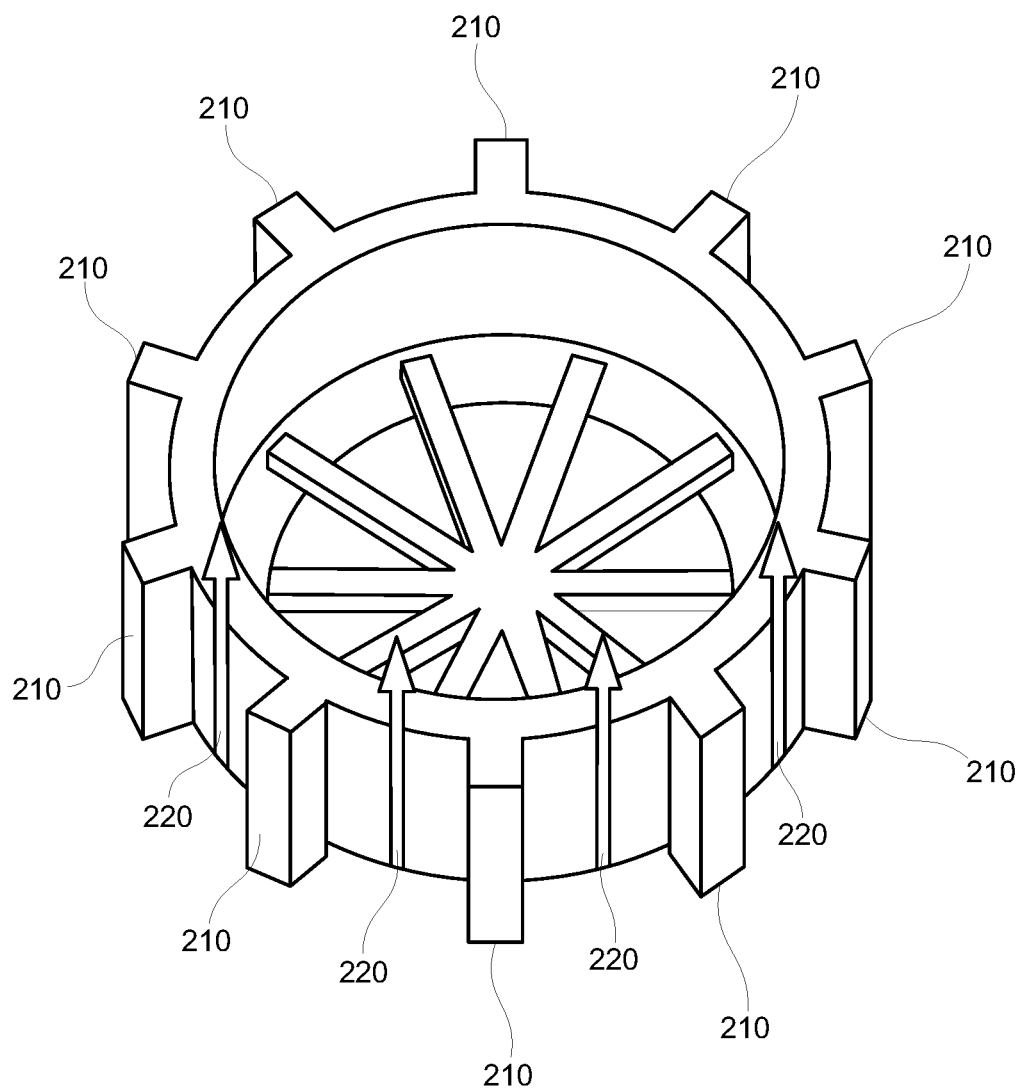
FIG. 2 shows the piston of FIG. 1A structure.

FIG. 2 shows the piston 125 structure. As can be seen, the piston is round and having tenons 210. This structure allows gases to pass between the tenons as demonstrated by arrows 220.

Upon activation, the inflator 130 releases gas which flows between the tenons 210 and pushes the upper cover 110 thereby discarding the upper cover 110 and clearing the path for the UAV to be released. Then, the gas pushes the piston 125 and thereby releases the UAV.

It will be appreciated that the piston's shape, weight and size may be adjusted according to the UAV's weight, the capsule's size, etc.

It will be appreciated that the present invention is not limited to the configuration of the exemplary capsule of FIGS. 1 and 1A and any release actuator known in the art may be used in order to release the UAV from the capsule.

Figure 3:
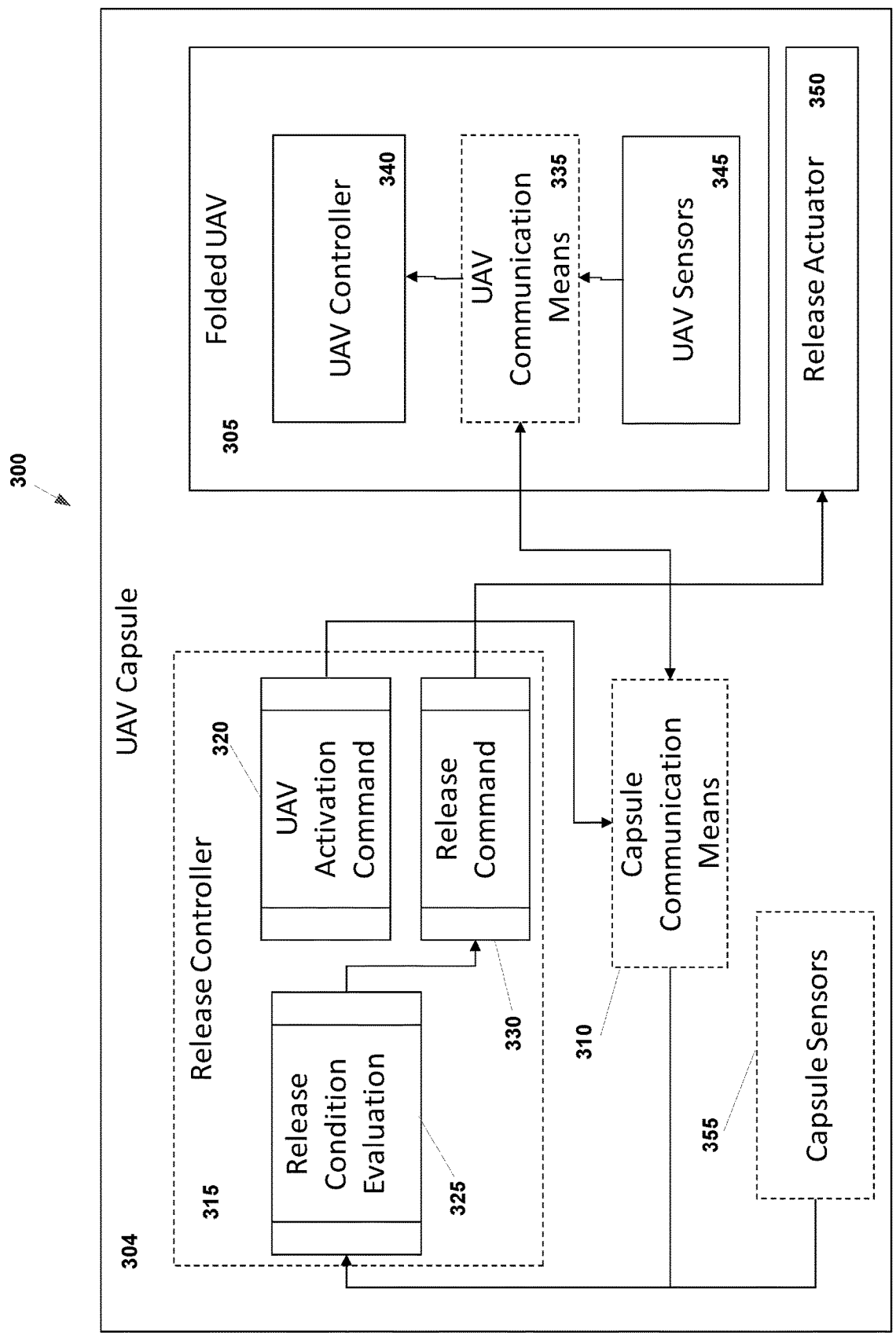
FIG. 3 is a block diagram of exemplary designated capsule and UAV, according to embodiments of the present invention.

FIG. 3 is a block diagram 300 of exemplary designated capsule 304 and UAV 305, according to embodiments of the present invention. The capsule 304 comprises capsule wire or wireless communication means 310 and a release controller 315 comprising a UAV activation command module 320 and a release condition evaluation module 325 connected with a release command module 330. The UAV 305 comprises UAV wire or wireless communication means 335 connected with UAV controller 340 and UAV sensors 345.

The UAV activation command module 320 is connected with the UAV controller 340 via communication means 310 and 335. The UAV sensors 345 are connected with the release condition evaluation module 325 via communication means 310 and 335.

The release command module 330 is connected with a release actuator 350.

It will be appreciated that the capsule 304 and the UAV 305 are not limited to include communication means. According to embodiments of the present invention, the UAV 305 may be released using a timer.

According to embodiments of the present invention, the capsule 304 may further comprise capsule sensors 355 connected with the release condition evaluation module 325.

According to embodiments of the present invention, based on measurements provided by the UAV sensors 345 and/or the capsule sensors 355 and upon release condition(s) being met, the release command module 330 activates the release actuator 350 which releases the UAV 305. Prior or during the release, the UAV activation command module 320 activates the UAV 305.

It will be appreciated that the UAV capsule 304 is not limited to include the release controller 315, the capsule communication means 310 and the capsule sensors 355. According to embodiments of the present invention, the UAV 305 may comprise the release controller 315 as part of the UAV controller 340 or as a separate controller and may execute the evaluation, activation and release command using sensors 345. In such a case, the UAV sensors 345 are connected with the release condition evaluation module, the UAV activation command module is connected with the UAV controller 340 and the release command is connected with the release actuator 350.

It will be appreciated that, according to embodiments of the present invention, the release command may be sent from a distant location, e.g., by an operator.

Figure 4:
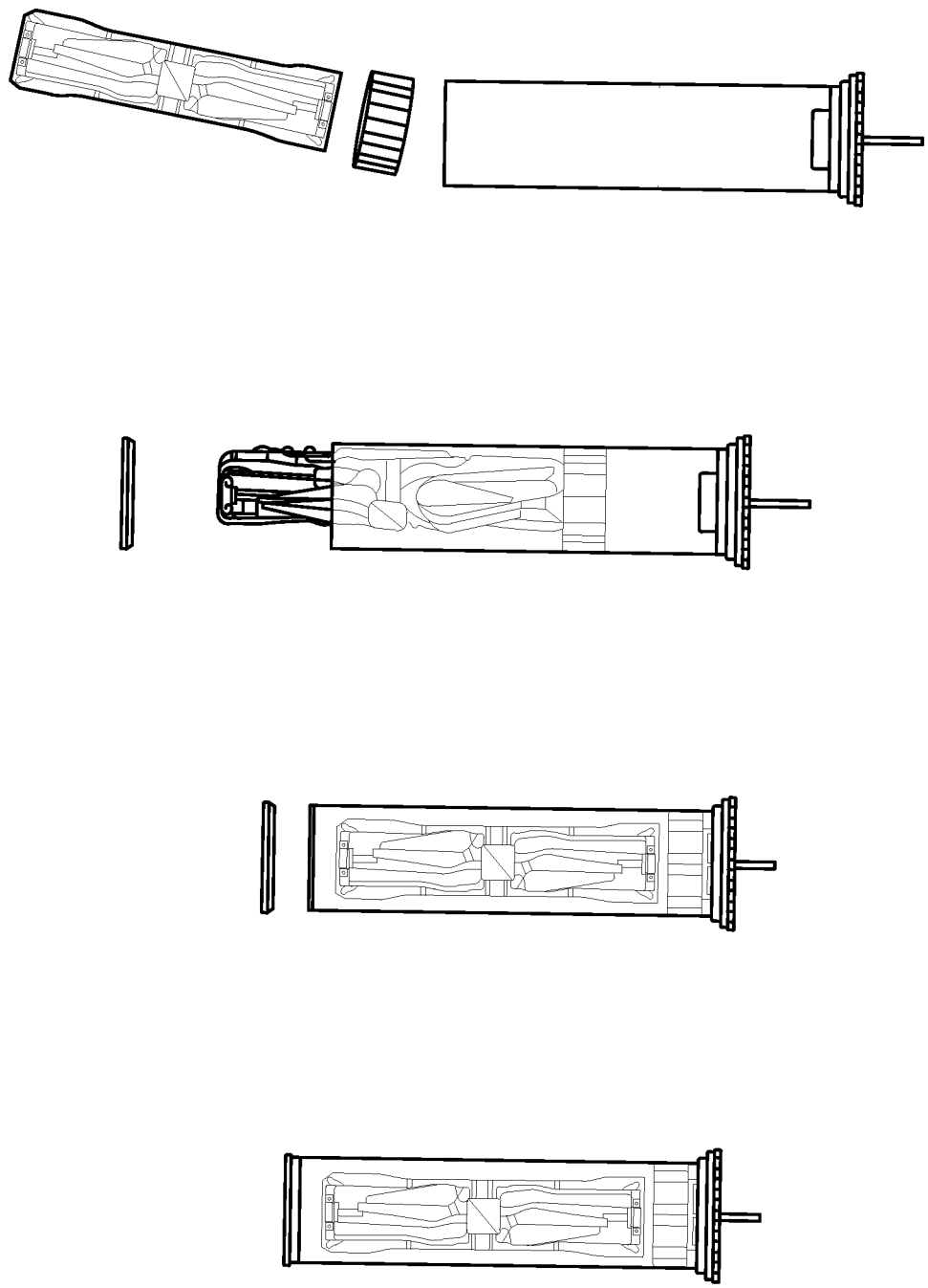
FIG. 4 shows an exemplary releasing process.

FIG. 4 shows an exemplary releasing process where the upper cover of the capsule is pushed and then a UAV is released.

Figure 5:
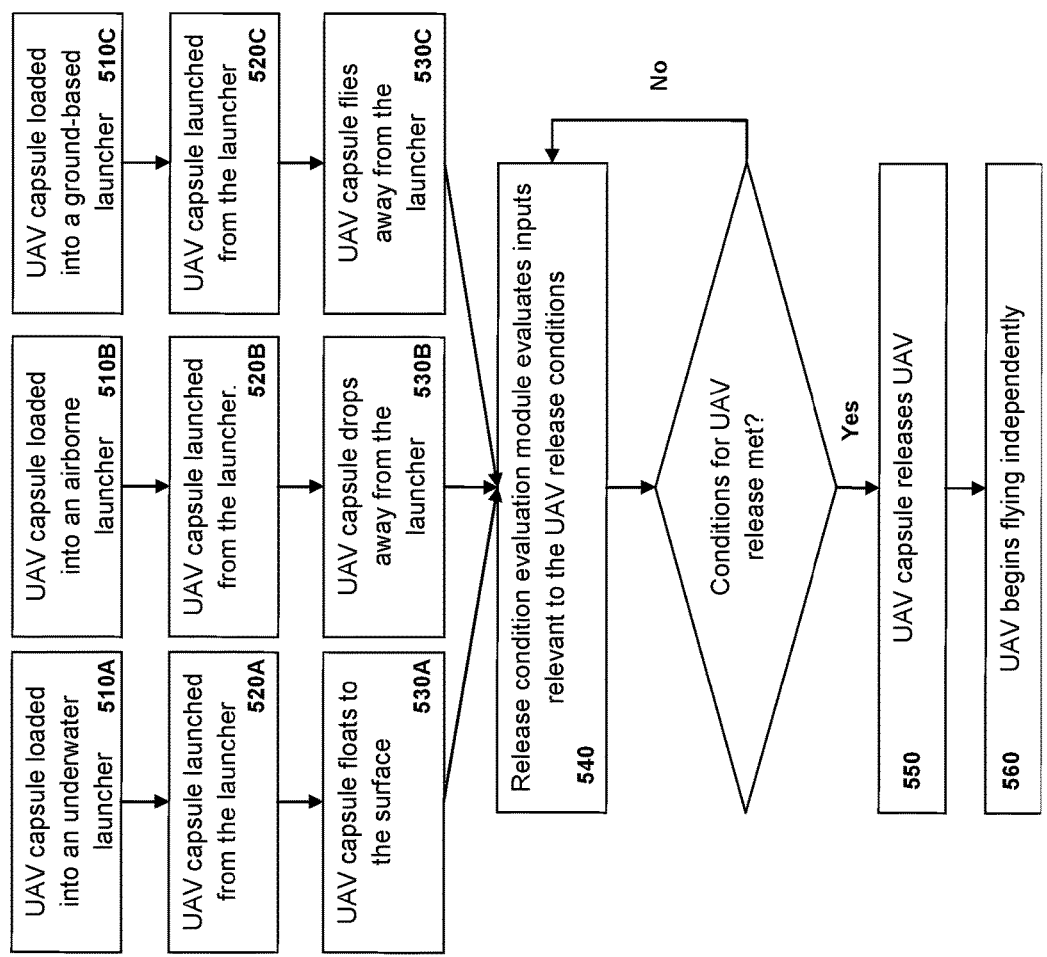
FIG. 5 is a flowchart showing the process of launching a designated capsule and releasing a UAV, according to embodiments of the present invention.

FIG. 5 is a flowchart 500 showing the process of launching the designated capsule and releasing the UAV, according to embodiments of the present invention. In step 510A, 510B or 510C, the UAV capsule is either loaded into an underwater launcher, loaded into an airborne launcher, or loaded into a ground-based launcher. In step 520A, 520B or 520C, The UAV capsule is launched from the respective launcher. In step 530A, 530B or 530C the capsule is either floats to the surface, drops away from the launcher or flies away from the launcher, respectively. In step 540, the release condition evaluation module evaluates inputs relevant to the UAV release conditions. If the conditions are met, in step 550, the capsule releases the UAV. Otherwise, the process goes back to step 540. In step 560, the UAV may fly independently.

It will be appreciated that, according to embodiments of the present invention, the release command may be sent from a distant location, e.g., by an operator.

Conditions for releasing the UAV may be the reception of an external signal commanding the release, a signal from the UAV indicating its readiness for release, the capsule's orientation and position being within predefined limits, the passing of a predefined time since activation or the arrival of a predefined release time.

According to embodiments of the present invention, a self-contained launcher capsule may begin its operation while underwater or floating on the water's surface, for example, due to being ejected from an underwater vehicle, released from an underwater launcher or dropped into the water from a surface vessel or air vehicle.

According to embodiments of the present invention, the capsule may be designed so that the drone occupies its lower portion, leaving a pocket of air or lighter-than-air gas between the UAV and the top edge of the capsule. The capsule's mass and volume are further designed so that it is buoyant, and its mass distribution is such that its center of weight is located lower than its center of buoyancy while floating on water, ensuring that the capsules floats to the water's surface and remains stable.

The capsule is designed so that it is safe to release the UAV at a range of angles and angular rates. According to embodiments of the present invention, the capsule's release control system samples the capsule's angular state and evaluates whether the capsule is at a safe position for release, providing a condition for release. The capsule may also use data such as acceleration, angle and pressure data to evaluate whether the capsule is currently floating on the surface or not, providing an additional condition for release.

Once the conditions are met, the capsule may release the UAV immediately, or wait for a command received through a datalink or other wired or wireless communication means.

According to embodiments of the present invention, the capsule may be used with a purpose-built holder, allowing one or more capsules to be held at a chosen location, awaiting the conditions for UAV release. The holder may additionally provide the capsule with services, such as remote activation, external power supply and a communication link. The holder may additionally be intended to transition at least one of the capsules from a state suitable for long-term storage or standby to a state suitable for releasing the UAV.

According to embodiments of the present invention, the deployment process may include physically repositioning the capsule, providing it with power and or/signals causing it to activate, providing it with data necessary for the mission and providing signals indicating to the capsule that it is deployed and may release the UAV.

According to embodiments of the present invention, an underwater holder, fixed to the seafloor or to an underwater structure or vehicle, may be connected to the capsule using, for example, a tether. The tether may comprise wires for power supply and communication with the capsule. The holder may alternately comprise a clamp or other restraining device gripping the capsule in place. The tether or restraining device hold the capsule underwater or at the water's surface, where they may be harder to spot and more resistant to damage, while the external power and communication connections allow the capsule to maintain readiness for long periods of time by saving battery power, and to respond to a deployment command delivered by means other than the UAV's or capsule's wired or wireless communication means. The deployment actuator may act to extend or cut the tether and wires, or open the restraining device, allowing the capsule to float freely and reach a position suitable for releasing the UAV.

According to embodiments of the present invention, the holder may be located on land, for example, as a stand-alone device placed in a target area by ground forces, or as part of a broader security system installed in a secure compound. The holder may comprise a deployment function involving a physical movement, for example, raising the capsule(s) into a firing position, or may alternately hold the capsule(s) in a fixed position suitable for releasing the UAV. It may further comprise a deployment function powering up the capsule and sending it signals commanding it to release the drone, upon receiving a command through a wired or wireless communication means.

According to embodiments of the present invention, the deployment controller may cause the capsule to transition from a shut-down or low-power state to an activated state, allowing the capsule to begin preparations for UAV release.

According to embodiments of the present invention, the holder may comprise an internal deployment controller operating the deployment actuator and controlling when to deploy and/or activate the capsule. Alternately, the deployment controller may be connected to the capsule or UAV's release controller, and operate under its control or may be included in the capsule or UAV's controller.

According to embodiments of the present invention, the holder may contain wired or wireless communication means, e.g., a datalink, allowing the deployment and/or release controllers to receive commands or other information necessary to determine the conditions for deployment operations. This wired or wireless communication means may be operatively connected to wired or wireless communication means in the capsule and/or the UAV, providing the capability to communicate with them before and/or after the capsule is deployed.

Figure 6:
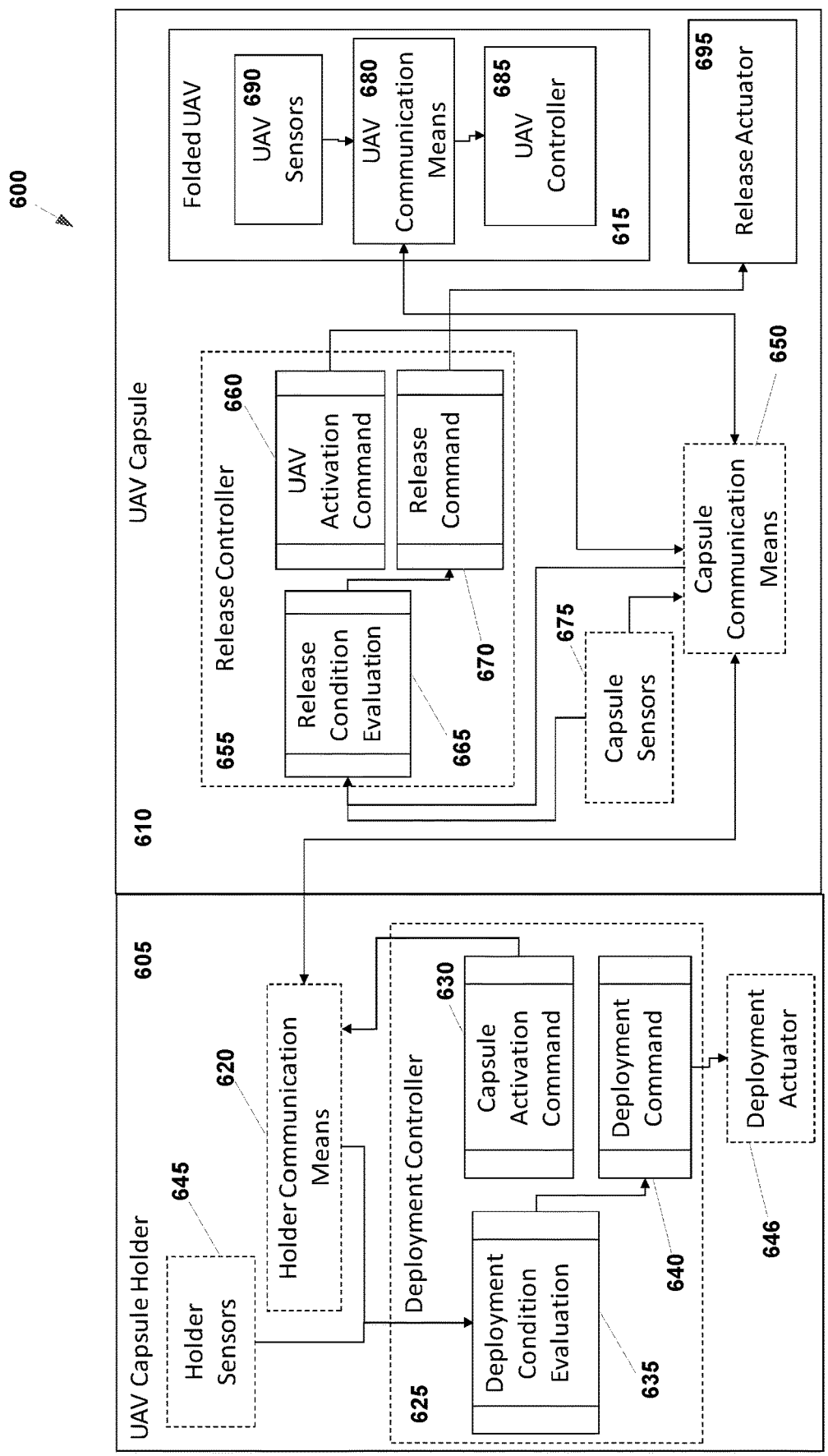
FIG. 6 is a block diagram of exemplary holder, designated capsule and UAV, according to embodiments of the present invention.

FIG. 6 is a block diagram 600 of exemplary holder 605, designated capsule 610 and UAV 615, according to embodiments of the present invention. The holder 605 comprises holder wire or wireless communication means 620 and a deployment controller 625 comprising a capsule activation command module 630 and a deployment condition evaluation module 635 connected with a deployment command module 640. According to embodiments of the present invention, the holder 605 may further comprise holder sensors 645 connected with the deployment condition evaluation module 635. The deployment command module 640 is connected with a deployment actuator 646.

The holder wire or wireless communication means 620 are connected with the deployment condition evaluation module 635 and with the capsule activation command module 630. Prior or during the deployment, the capsule activation command module 630 may activate the capsule 610.

The capsule 610 comprises capsule wire or wireless communication means 650 and a release controller 655 comprising a UAV activation command module 660 and a release condition evaluation module 665 connected with a release command module 670. According to embodiments of the present invention, the capsule 610 may further comprise capsule sensors 675 connected with the release condition evaluation module 665. The capsule wire or wireless communication means 650 are connected with the release condition evaluation module 665, with the UAV activation command module 660 and with the holder wire or wireless communication means 620. The release command module 670 is connected with a release actuator 695.

The UAV 615 comprises UAV wire or wireless communication means 680 connected with UAV controller 685 and UAV sensors 690.

The UAV activation command module 660 is connected with the UAV controller 685 via communication means 650 and 680. The UAV sensors 690 are connected with the release condition evaluation module 665 via communication means 650 and 680.

It will be appreciated that the holder 605, the capsule 610 and the UAV 615 are not limited to include communication means. According to embodiments of the present invention, the capsule 610 may be deployed and the UAV 615 may be released using a timer.

According to embodiments of the present invention, based on measurements provided by the UAV sensors 690 and/or the capsule sensors 675 and/or the holder sensors 645 and upon deployment condition(s) being met, the deployment command module 640 activates the deployment actuator 646 which deploys the capsule 610.

According to embodiments of the present invention, based on measurements provided by the UAV sensors 690 and/or the capsule sensors 675 and upon release condition(s) being met, the release command module 670 activates the release actuator 695 which releases the UAV 615. Prior or during the release, the UAV activation command module 660 activates the UAV 615.

It will be appreciated that the holder 605 is not limited to include the deployment controller 625, the holder communication means 620 and the holder sensors 645. It will be appreciated that the UAV capsule 610 is not limited to include the release controller 655, the capsule communication means 650 and the capsule sensors 675.

According to embodiments of the present invention, any one of the deployment controller 625 and/or the release controller 655 may be comprised in any one of the holder 605, the capsule 620 or the UAV 615.

According to embodiments of the present invention, the UAV 615 may comprise the deployment controller 625 and/or the release controller 655 as part of the UAV controller 685 or as a separate controller(s) and may execute the evaluation, deployment, release and activation using sensors 690. In such a case, the UAV sensors 690 are connected with the release condition evaluation module, the UAV activation command module is connected with the UAV controller 680 and the release command is connected with the release actuator 695.

It will be appreciated that at least one controller and at least one sensor comprised in any one of the holder 605, the capsule 610 and the UAV 615 may be used in order to deploy the capsule and release the UAV.

It will be appreciated that the holder is not limited to include a deployment actuator. According to embodiments of the present invention, the holder is intended to only hold the capsule without deploying it.

It will be appreciated that, according to embodiments of the present invention, the release command may be sent from a distant location, e.g., by an operator.

Figure 7:
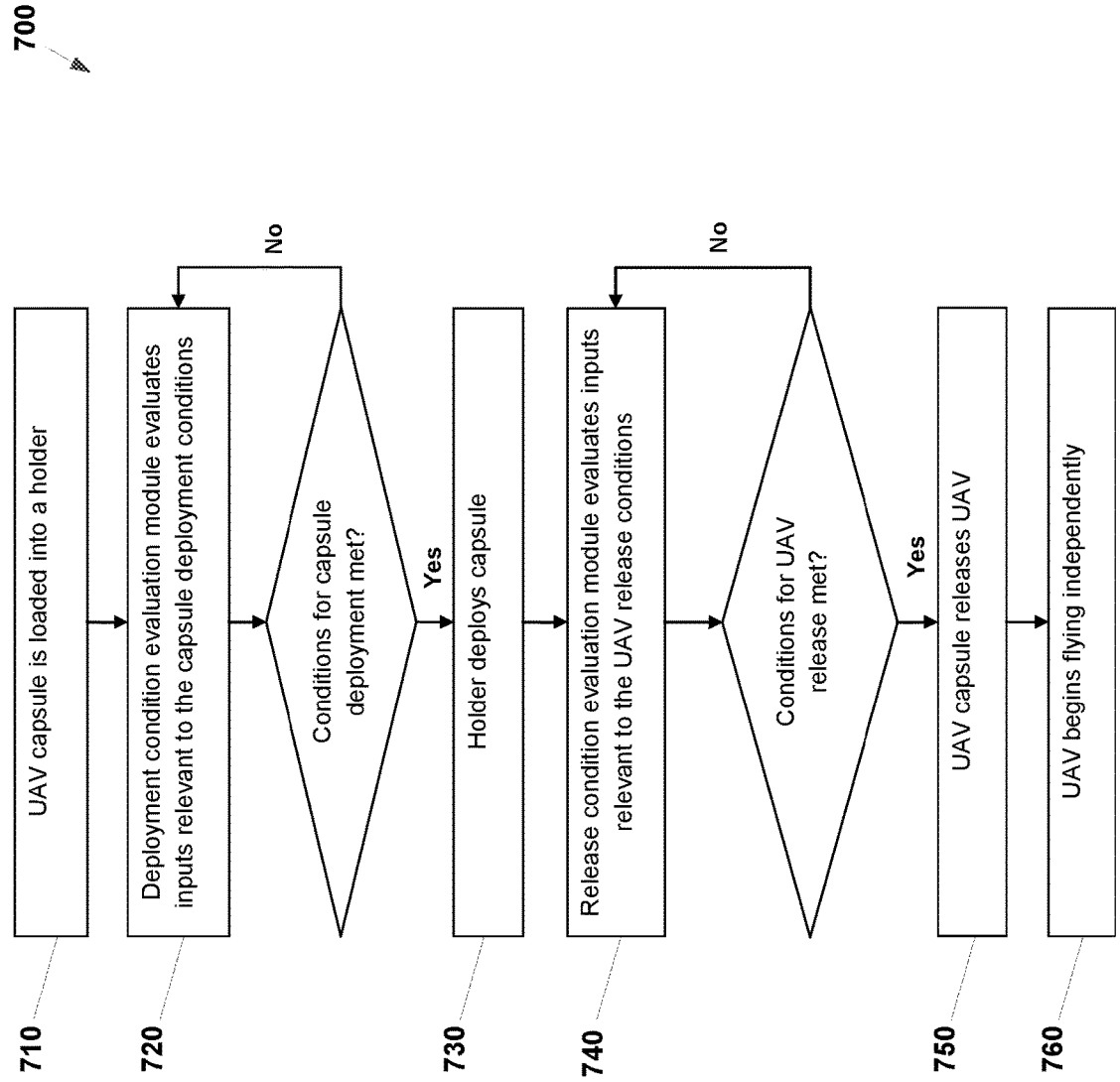
FIG. 7 is a flowchart showing the process of deploying a designated capsule and releasing a UAV, according to embodiments of the present invention.

FIG. 7 is a flowchart 700 showing the process of deploying the designated capsule and releasing the UAV, according to embodiments of the present invention. In step 710, the UAV capsule is loaded into the holder. In step 720, the deployment condition evaluation module evaluates inputs relevant to the capsule deployment conditions. If the conditions are met, in step 730, the holder deploys the capsule. Otherwise, the process goes back to step 720. In step 740, the release condition evaluation module evaluates inputs relevant to the UAV release conditions. If the conditions are met, in step 750, the capsule releases the UAV. Otherwise, the process goes back to step 740. In step 760, the UAV may fly independently.

It will be appreciated that, according to embodiments of the present invention, the deployment and/or release command may be sent from a distant location, e.g., by an operator.

Conditions for deploying the capsule may be the reception of an external signal commanding the deployment, the holder's position and orientation being within predefined limits, the passing of a predefined time since the holder's activation and the arrival of a predefined release time.

Conditions for releasing the UAV may be the reception of an external signal commanding the release, a signal from the UAV indicating its readiness for release, the capsule's orientation and position being within predefined limits, the passing of a predefined time since activation or the arrival of a predefined release time.

According to embodiments of the present invention, the holder does not include a deployment actuator and is intended to only hold the capsule.

Figure 8:
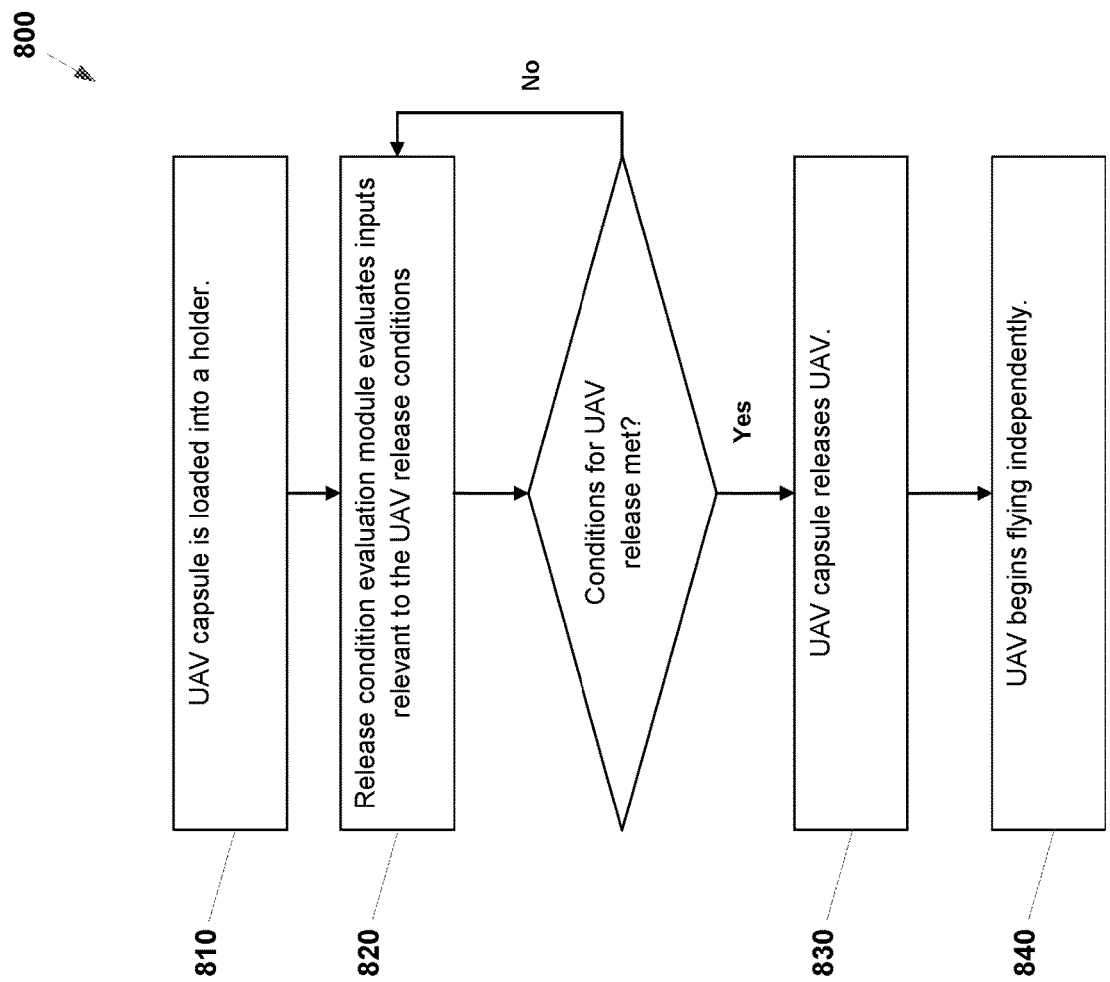
FIG. 8 is a flowchart showing the process of launching a designated capsule from a holder and releasing a UAV, according to embodiments of the present invention.

FIG. 8 is a flowchart 800 showing the process of launching the designated capsule from a holder and releasing the UAV, according to embodiments of the present invention. In step 810, the capsule is loaded into the holder. In step 820, the release condition evaluation module evaluates inputs relevant to the UAV release conditions. If the conditions are met, in step 830, the capsule releases the UAV. Otherwise, the process goes back to step 820. In step 840, the UAV may fly independently.

It will be appreciated that, according to embodiments of the present invention, the release command may be sent from a distant location, e.g., by an operator.

According to embodiments of the present invention, when the capsule is intended to be launched under water, the capsule may further comprise arms connected to floats.

Figure 9:
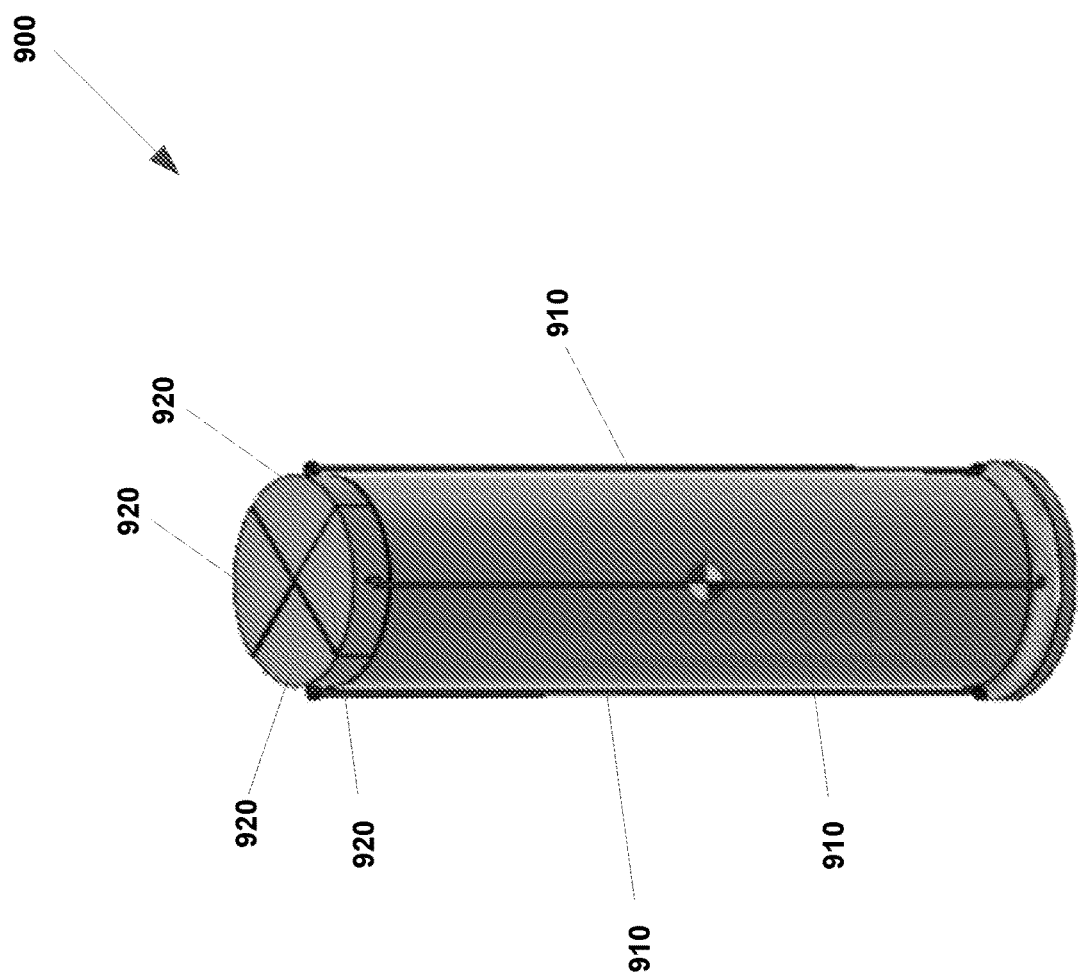
FIG. 9 shows another exemplary capsule comprising arms and floats.

FIG. 9 shows another exemplary capsule 900 comprising arms 910 (three are shown) and floats 920 (four are shown). It will be appreciated that the capsule is not limited to these exact numbers of arms and floats.

Figure 9A:
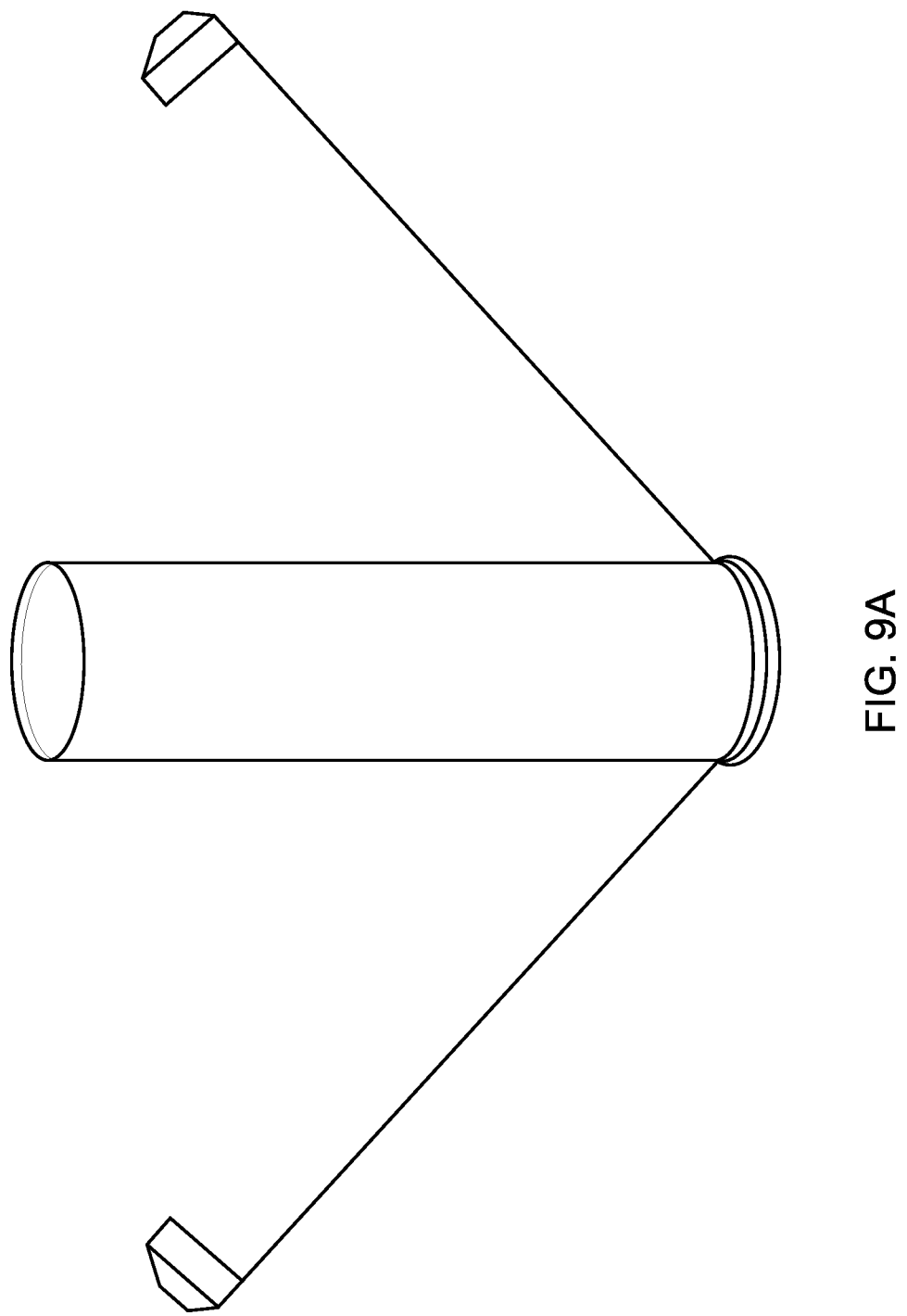
FIG. 9A shows the exemplary capsule of FIG. 9 in an open state.

According to embodiments of the present invention, in a case where the UAV is launched under water, the capsule 900 is released, reaches the water line, opens the arms as demonstrated in FIG. 9A, which stabilize the capsule, and enables the UAV to be safely released as explained above.

In order to better illustrate the range of application for the present invention, two additional exemplary embodiments are provided along with usage examples. These embodiments differ in the environment where the UAV and capsules are used, and in the way various system components are integrated into the holder, capsule, UAV or external systems.

According to an embodiment of the present invention, a UAV is provided in a capsule optimized for underwater use.

Figure 10:
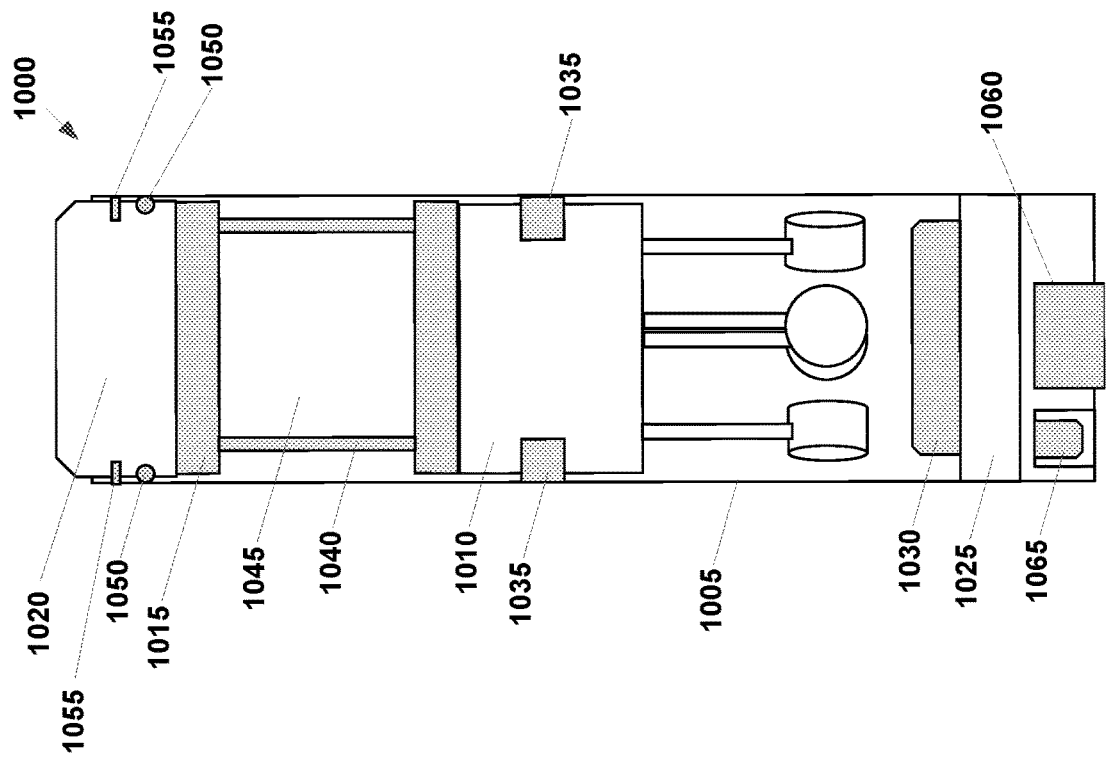
FIG. 10 is a schematic section cut of an exemplary underwater capsule, according to embodiments of the present invention.

FIG. 10 is a schematic section cut of an exemplary capsule 1000, according to embodiments of the present invention. The capsule 1000 comprises an outer shell (body) 1005 that encloses a space that contains a capsule base at the bottom, a folded UAV 1010, a spacer 1015 and a cap 1020 at the top, along with wiring, screws, fittings and other minor components needed to realize the structure of the capsule described. The capsule's mass distribution is such that its center of weight is lower than its center of buoyancy, enabling it to float upright on the water's surface. The capsule may be intended to be either launched from a vehicle-based launcher (e.g., on a submarine) or deployed from a holder.

The base of the capsule comprises a weight 1025 enabling the mass distribution, and a gas generator 1030 capable of creating a high pressure inside the capsule. The UAV 1010 resides inside the capsule in a folded state. The UAV's body comprises at least one divider 1035 (two are shown) that forms a loose seal against the capsule's shell, dividing the capsule's inner space into a lower and upper section. The spacer 1015 is mounted on top of the UAV 1010 and comprises rigid arms 1040 that span the length of the capsule between the top of the UAV and the bottom of the cap 1020, creating an empty space 1045 containing air or other gas providing buoyancy. The cap 1020 is mounted on top of the spacer 1015 and comprises a circumferential sealing section 1050 providing a tight seal against the capsule's shell 1005, effectively sealing the capsule's interior against air and water intrusion, and a set of shear pins 1055 (two are shown) securing the cap to the capsule. The cap 1020 comprises the capsule's electronics. Along the capsule, wiring connects the cap's electronics, the UAV and any external connectors on the capsule, designed with detachment points allowing the cap and the UAV to physically detach from the wiring, e.g., as the UAV is released. The capsule further comprises an electrical connector 1060 and a switch 1065.

UAV release is actuated by the gas generator 1030. The interior of the capsule achieves a high pressure, with the lower section containing the generator receiving the highest pressure, and a pressure differential between the two sections that is dictated by the design of the divider built into the UAV's body or tightly fitted around it. The pressure differential between the two sections causes the UAV's body to push against the spacer 1015, which in turn, pushes against the cap 1020. The pressure differential between the upper section and the environment creates an additional pushing force against the cap 1020, the combined force causing the shear pins 1055 to break, freeing the UAV 1010, spacer 1015 and cap 1020 to proceed outward under pressure, leaving the capsule at a high speed dictated by the design of the at least one divider 1035. The wiring connections are detached as the UAV moves out of the capsule and the cap and spacer falls away, completing the UAV's release.

According to embodiments of the present invention, the capsule's electronics comprise an electrical interface to externally activate the capsule and optionally power and communicate with it, a controller for running the capsule's logic, an inertial sensor providing measurements of the capsule's orientation, an optional GPS receiver to provide location information and an optional wireless communication means, e.g., datalink, providing the capability for the capsule to receive a wireless release command and to report its status to a remote operator. The capsule is operatively connected to the UAV, allowing the capsule's controller to activate the UAV and control it prior to the release, and to optionally draw power from the UAV.

The capsule's controller is further intended to electrically activate and communicate with the UAV, transitioning the UAV from a powered-down state to a state of readiness for release, with this action taking place after the capsule itself is activated.

The capsule's controller is configured with conditions for enabling the capsule's release, including, but not limited to, an orientation limit (for example, only allowing release to take place at an orientation between 0 and 25 degrees of vertical), a time limit (for example, only allowing release to take place starting from 5 minutes after the capsule's launch or deployment), a UAV readiness limit (for example, only allowing the release to take place if the UAV is successfully activated and readied for release) and a release command requirement (for example, only allowing release to take place when the capsule receives a command through its wireless or wired communication interface).

According to an exemplary embodiment, the capsule is used with a launcher built into a submarine. For use with the launcher, the capsule is configured with an orientation limit, a time limit, a UAV readiness limit and a wireless release command requirement and is configured to draw power from the UAV's battery. The capsule is activated by a crewmember, and promptly loaded into the launcher and launched. The capsule floats to the surface, activates the UAV inside and reports its status to the submarine using the wireless communication means. The submarine is now free to depart the launch area and provide the release command at its convenience (e.g., once the submarine is safely away from the launch area, and the capsule is carried by ocean currents closer to the target area). Once the submarine issues a release command, the UAV is released from the capsule, and can be controlled from the submarine using its wireless communication means or execute a preconfigured mission.

According to another exemplary embodiment, the capsule is used with an underwater holder providing the capability for multiple capsules to be held underwater at a location of interest and be deployed as necessary.

It will be appreciated that the exemplary capsule of FIG. 10 is not limited to be used underwater and may be launched from any other location such as a land platform, manned or unmanned ground vehicles, buildings, fenceposts and the like.

Is such cases, it will be appreciated that the exemplary capsule of FIG. 10 is not limited to include the weight 1025.

It will be appreciated that the exemplary capsule of FIG. 10 is not limited to include the spacer 1015.

It will be appreciated that the top and bottom end of the exemplary capsule of FIG. 10 are not limited to be tightly sealed and may be at least partially sealed. Moreover, the top end of the exemplary capsule of FIG. 10 may be rigidly or flexibly coupled to the capsule body.

Figure 11:
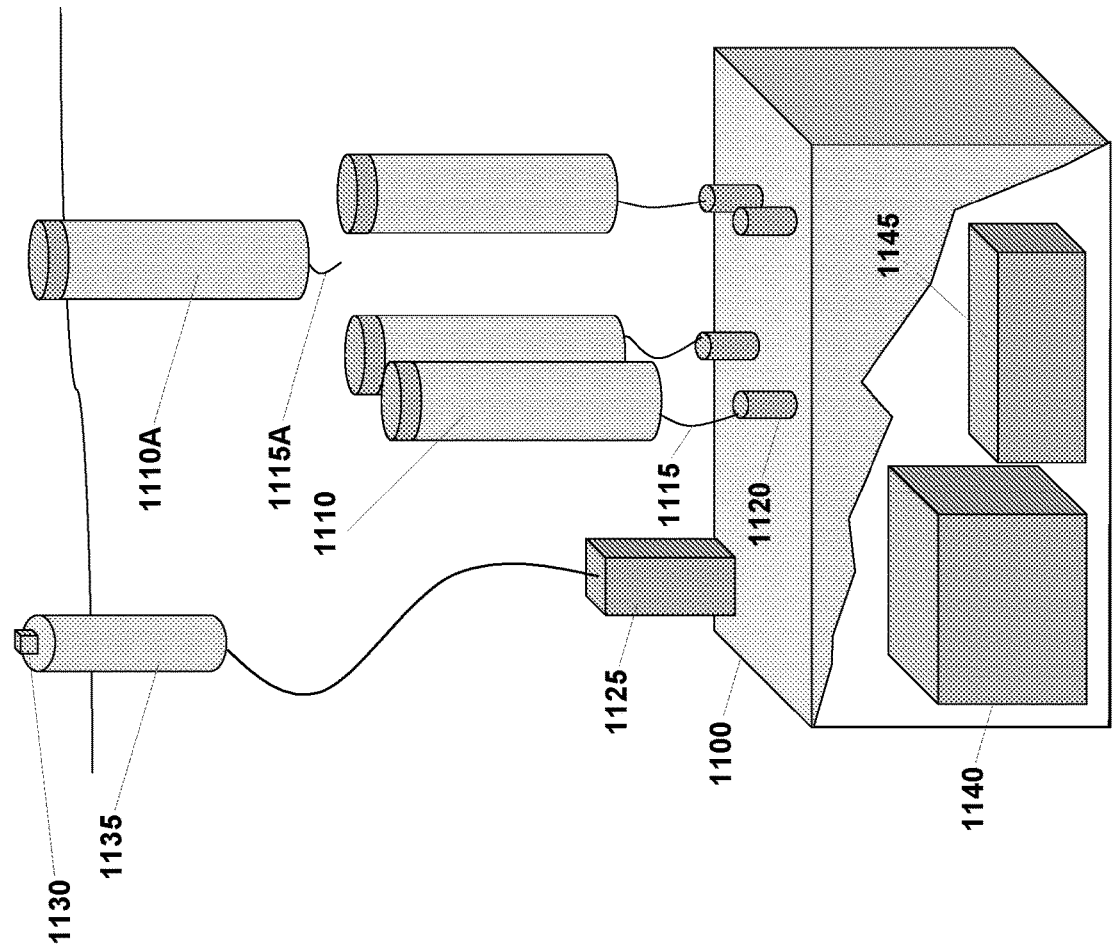
FIG. 11 is a schematic view of an exemplary underwater holder, according to embodiments of the present invention.

FIG. 11 is a schematic view of an exemplary underwater holder 1100, according to embodiments of the present invention. The holder 1100 comprises, for each held capsule 1110, a tether, e.g., 1115 holding the capsule in place, a cutting device 1120 capable of cutting the tether 1115 on command, and an electrical connection with the capsule allowing the capsule to be activated (separate connection or through the tether). The holder 1100 further comprises an internal battery 1140, a controller 1145 for running the holder's logic and optional sensors, such as, for example, a flow rate sensor for measuring ocean currents (not shown). The holder's controller is configured with the ability to deploy each of the held capsules, activate a desired capsule through the electrical connection or wirelessly, and cut the tether using a command delivered to the cutter. The controller's deployment logic is configured to deploy capsules upon a command received through the communication means, while, optionally, enforcing an ocean current limit (inhibiting the deployment of capsules when the measured ocean currents exceed a safety limit). Capsule 1110A represents a deployed capsule with a cut tether 1115A.

According to embodiments of the present invention, the holder 1100 may further comprise communication means 1125, e.g., datalink, with an antenna 1130 held afloat by a buoy 1135. According to embodiments of the present invention, the antenna is used in order to communicate with the capsule for release purposes.

It will be appreciated that the holder is not limited to include a cutter, communication means, antenna and buoy. According to embodiments of the present invention, the holder is intended to deploy the capsule by lengthening the tether. In such a case, the communication between the holder and the capsule may be performed through the tether or through an addition communication link between the holder and the capsule.

It will be appreciated that the present invention is not limited to the deployment solutions described and any way to bring the capsule from the holder's location to sea level may be used.

It will be appreciated that the present invention is not limited to the communication solutions described and any way to communicate between the holder and the capsule may be used.

According to embodiments of the present invention, a UAV is provided in a capsule optimized for use with holders installed on fixed or mobile land-based platforms.

Figure 12:
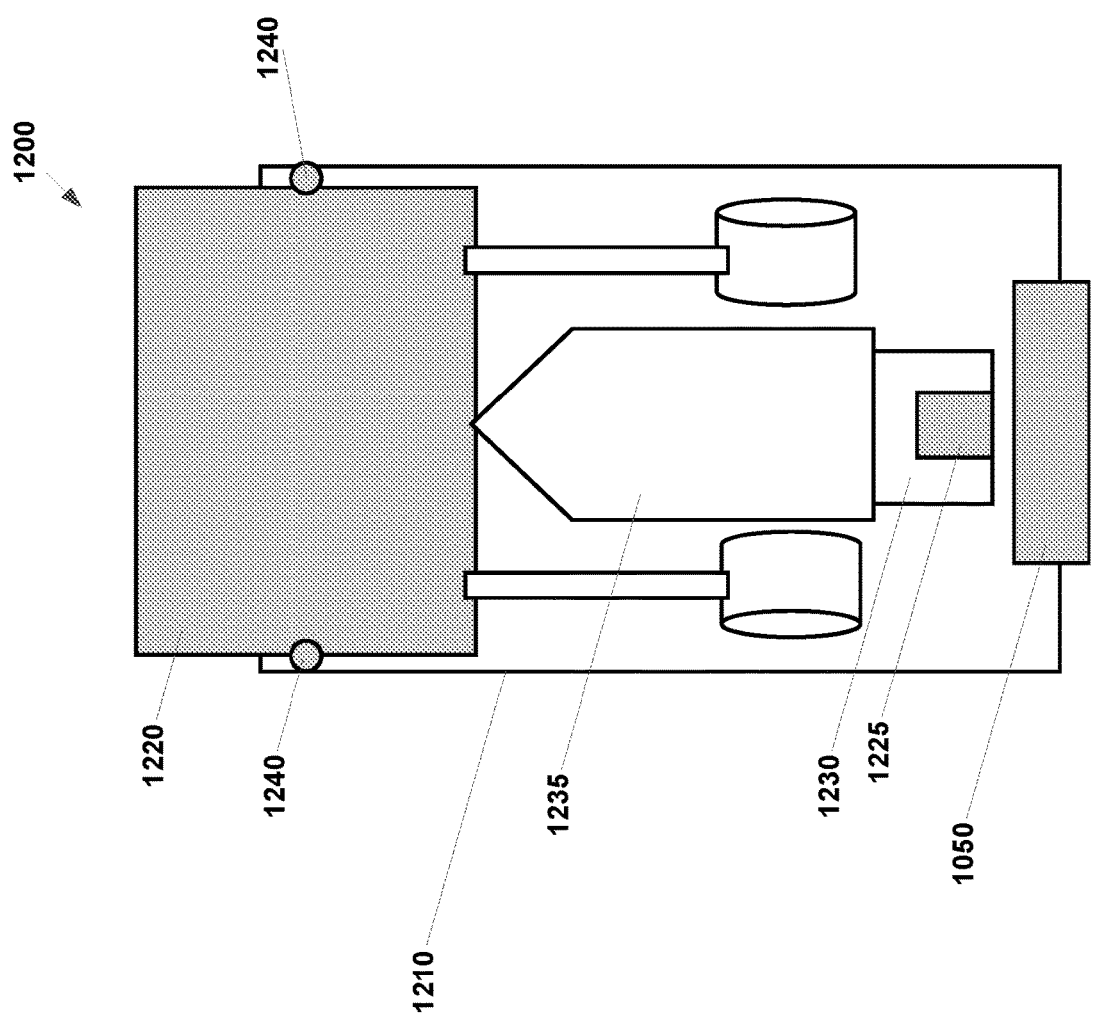
FIG. 12 is a schematic section cut of another exemplary capsule, according to embodiments of the present invention.

FIG. 12 is a schematic section cut of another exemplary capsule 1200, according to embodiments of the present invention. The capsule 1200 comprises an outer shell (body) 1210 that encloses a space that contains a capsule base at the bottom, a pusher element and a folded UAV 1220, along with wiring, screws, fittings and other minor components needed to realize the structure of the capsule described. Wiring inside the capsule connects the UAV to electrical connections in the capsule, designed to safely detach as the UAV exits the capsule.

The base of the capsule comprises a gas generator 1225 capable of creating a high pressure, a tube 1230 surrounding the gas generator and projecting upwards, and electrical connections allowing the capsule to be connected to the holder. A pusher 1235 is mounted on the tube 1230, with the two nested inside each other and creating an at least partially sealed volume where the gas generator may generate pressure. The UAV 1220 resides inside the capsule in a folded state, above the pusher. The UAV's body is mounted on the pusher and comprises a circumferential sealing section 1240 that forms an at least partial seal against the capsule's outer shell. The portion of the UAV's body residing outside the seal acts as the capsule's cap, providing ingress protection for the capsule's interior.

UAV release is actuated by the gas generator 1225. The volume constrained by the base's tube and the pusher 1235 achieves a high pressure. The pressure exerts a force on the pusher, which in turn pushes the UAV 1220, against the lower ambient pressure outside. This pressure breaks the at least partial seal formed by sealing section 1240 between the UAV's body and the capsule's shell, and the UAV and pusher are free to accelerate out of the capsule. The wiring connections are detached as the UAV moves out of the capsule and the pusher falls away from the UAV, completing the UAV's release.

The capsule further comprises and electrical interface, which allows the UAV to be activated and communicated with from outside the capsule. It comprises a further interface, which allows the UAV's on-board controller to control the activation of the gas generator, essentially controlling the release.

The capsule is designed to be placed into a holder installed on a land platform, such platforms including, for example, manned or unmanned ground vehicles, buildings and fenceposts, with the holder enabling one or more capsules to be held.

It will be appreciated that the UAV of the exemplary capsule of FIG. 12 is not limited to include a circumferential sealing section 1240 and may be positioned inside or above the capsule body without creating a seal against the capsule body.

FIG. 13 is a schematic view of an exemplary holder 1300, according to embodiments of the present invention. Each holder 1300 is capable of containing one capsule and may be installed, for example, on a fencepost and controlled remotely to allow a UAV to be released on demand. Such holders may be installed at intervals on a fence to allow UAV's to be quickly released.

The holder 1300 comprises a base 1310 allowing the holder to be affixed to any location, e.g., a fencepost 1305, and a housing 1320 designed to contain the capsule 1330, comprising an electrical connector mating with the capsule and a physical enclosure holding the capsule securely in place and absorbing the shock generated by the UAV's 1340 release. The holder 1300 further comprises a power and data connection 1350 allowing the holder, capsule and UAV to be connected to a remote system. It will be appreciated that the communication may be wireless and the power supply may be a battery. When a UAV is needed, the holder activates the UAV by sending an electrical signal to the holder. The signal passes through wiring in the holder and capsule and reaches the UAV, causing it to power up and begin preparing for release. The UAV's internal electronics carry out the function of release control, inhibiting the UAV's release until conditions are met, such as successful start-up tests. When the release conditions are met, the UAV enables the gas generator, causing the UAV to be released from the capsule. At this point the UAV may be further controlled using its built-in wireless communication means or execute a preconfigured mission.

In order to recharge the holder, an operator approaches the holder, removes the spent capsule shell 1330A and installs a fresh capsule. As the capsule is replaced, the holder may receive an indication that the UAV has been replenished.

It will be appreciated that the process of deploying the capsule or launching the capsule is a different and separate process than the process of releasing the UAV from the capsule, namely, it is necessary that the deployment or the launching of the capsule will occur in order to release the UAV, but none of these processes automatically triggers the release process.

It will be appreciated by persons skilled in the art that the present invention is not limited to what has been particularly shown and described hereinabove. Rather the scope of the present invention is defined by the appended claims and includes combinations and sub-combinations of the various features described hereinabove as well as variations and modifications thereof which would occur to persons skilled in the art upon reading the foregoing description.

The invention claimed is:

1. A designated Unmanned Aerial Vehicle (UAV) capsule, comprising:
   a capsule body, comprising:
      a gas inflator mounted above at least partially sealed bottom end of said capsule body;
      a designated piston comprising tenons;
   said designated piston mounted above said gas inflator;
      a UAV mounted above said designated piston; and an upper cover, mounted above said UAV, and configured to at least partially seal said capsule body's upper end;

wherein said gas inflator is configured to release gas, towards said designated piston to be flowing between said tenons thereby discarding said upper cover and pushing said designated piston thereby releasing said UAV.

2. The capsule of claim 1, wherein said capsule body further comprises an activation cable configured to enable activation of said release.

3. A designated Unmanned Aerial Vehicle (UAV) capsule, comprising:
  a capsule body, comprising:
    a gas generator mounted above at least partially sealed bottom end of said capsule body;
    a UAV mounted above said gas generator;
    at least one divider mounted between said UAV and an inner circumference of said capsule body; said at least one divider configured to create at least partial seal between said UAV and said capsule body, thereby creating an at least partially sealed lower volume between said gas generator and said at least one divider; and
    an upper cover configured to at least partially seal said capsule body's upper end;
  wherein said gas generator is configured to release gas into said at least partially sealed lower volume, thereby increasing pressure inside said at least partially sealed lower volume and releasing said UAV.

4. The capsule of claim 3, wherein said capsule body further comprises a spacer mounted between said UAV and said upper cover.

5. The capsule of claim 3, wherein said capsule body further comprises a weight mounted between said gas generator and said at least partially sealed bottom end of said capsule body and configured to enable mass distribution in said capsule body.

* * * * *